US012677036B2

(12) United States Patent
Berezhnoy et al.

(10) Patent No.: US 12,677,036 B2
(45) Date of Patent: *Jul. 7, 2026

(54) VIDEO NOTIFICATION SYSTEM

(71) Applicant: Snap Inc., Santa Monica, CA (US)

(72) Inventors: Dmitry Berezhnoy, San Francisco, CA (US); Fei Li, Fremont, CA (US); Venkatraman Sridharan, Pleasanton, CA (US); Ian Anthony Wehrman, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/917,670

(22) Filed: Oct. 16, 2024

(65) Prior Publication Data

US 2025/0039505 A1 Jan. 30, 2025

Related U.S. Application Data

(63) Continuation of application No. 18/156,961, filed on Jan. 19, 2023, now Pat. No. 12,149,787.

(51) Int. Cl.
H04N 21/458 (2011.01)
H04N 21/431 (2011.01)
(Continued)

(52) U.S. Cl.
CPC ....... H04N 21/458 (2013.01); H04N 21/4312 (2013.01); H04N 21/4532 (2013.01);
(Continued)

(58) Field of Classification Search
CPC ....... H04N 21/23106; H04N 21/25891; H04N 21/26258; H04N 21/4312; H04N 21/4532;
(Continued)

(56) References Cited

U.S. PATENT DOCUMENTS

2003/0037041 A1 2/2003 Hertz
2006/0242259 A1* 10/2006 Vallabh .............. H04N 7/17318
709/217
(Continued)

FOREIGN PATENT DOCUMENTS

JP 2010283656 A 12/2010
WO WO-2024155797 A1 7/2024

OTHER PUBLICATIONS

"U.S. Appl. No. 18/156,961, Non Final Office Action mailed Mar. 26, 2024", 20 pgs.
(Continued)

*Primary Examiner* — Rong Le
(74) *Attorney, Agent, or Firm* — Schwegman Lundberg & Woessner, P.A.

(57) ABSTRACT

Systems and methods are provided for notifying users about videos in a playback sequence. The systems and methods determine that a video that meets a criterion is currently available on a video server associated with a messaging client. In response to determining that the video that meets the criterion is currently available, the messaging client on the client device prefetches a sequence of videos from a recommendation engine that match a profile of a user associated with the messaging client. The recommendation engine is being used to provide sequence of videos to a video playback graphical user interface (GUI) that automatically plays back the videos in the sequence. The systems and methods determine that the video that meets the criterion is in a first position in the sequence of videos and, in response, present a notification that indicates the availability of the video on the video playback GUI.

20 Claims, 10 Drawing Sheets

500

DETERMINE THAT A VIDEO THAT MEETS A CRITERION IS CURRENTLY AVAILABLE ON A VIDEO SERVER ASSOCIATED WITH A MESSAGING CLIENT IMPLEMENTED ON A CLIENT DEVICE — 501

CAUSE THE MESSAGING CLIENT ON THE CLIENT DEVICE TO PREFETCH A SEQUENCE OF VIDEOS FROM A RECOMMENDATION ENGINE THAT MATCH A PROFILE OF A USER ASSOCIATED WITH THE MESSAGING CLIENT, THE RECOMMENDATION ENGINE BEING USED TO PROVIDE SEQUENCE OF VIDEOS TO A VIDEO PLAYBACK GRAPHICAL USER INTERFACE (GUI) THAT AUTOMATICALLY PLAYS BACK THE VIDEOS IN THE SEQUENCE — 502

DETERMINE THAT THE VIDEO THAT MEETS THE CRITERION IS IN A FIRST POSITION IN THE SEQUENCE OF VIDEOS — 503

PRESENT, BY THE MESSAGING CLIENT, A NOTIFICATION THAT INDICATES THE AVAILABILITY OF THE VIDEO ON THE VIDEO PLAYBACK GUI — 504

(51) Int. Cl.

| | | |
|---|---|---|
| *H04N 21/45* | (2011.01) | |
| *H04N 21/466* | (2011.01) | |
| *H04N 21/472* | (2011.01) | |
| *H04N 21/488* | (2011.01) | |

(52) U.S. Cl.
CPC ....... *H04N 21/4668* (2013.01); *H04N 21/472* (2013.01); *H04N 21/4882* (2013.01)

(58) Field of Classification Search
CPC ............. H04N 21/458; H04N 21/4668; H04N 21/472; H04N 21/475; H04N 21/4755; H04N 21/4825; H04N 21/4826; H04N 21/4882
See application file for complete search history.

(56) References Cited

U.S. PATENT DOCUMENTS

| | | | |
|---|---|---|---|
| 2007/0006065 | A1 | 1/2007 | Jewsbury et al. |
| 2008/0244681 | A1 | 10/2008 | Gossweiler |
| 2013/0031162 | A1 | 1/2013 | Willis et al. |
| 2013/0132605 | A1 | 5/2013 | Kocks et al. |
| 2014/0068692 | A1* | 3/2014 | Archibong ......... H04N 21/4334 |
| | | | 725/116 |
| 2016/0050446 | A1* | 2/2016 | Fujioka ............... G06F 16/9535 |
| | | | 725/93 |
| 2017/0339465 | A1 | 11/2017 | Cannistraro et al. |
| 2017/0366854 | A1* | 12/2017 | Puntambekar ... H04N 21/25891 |
| 2019/0208288 | A1* | 7/2019 | Mihajlovic ........ H04N 21/8456 |
| 2020/0389705 | A1* | 12/2020 | Harris .................... G06Q 10/10 |
| 2023/0114681 | A1* | 4/2023 | Varma ............... H04N 21/4532 |
| | | | 725/14 |
| 2023/0139768 | A1* | 5/2023 | Buzinover ........... H04N 21/431 |
| | | | 348/565 |
| 2023/0199260 | A1* | 6/2023 | Doken ................ G06F 3/04812 |
| | | | 725/37 |
| 2023/0319337 | A1* | 10/2023 | Yamada ................. G06Q 10/02 |
| | | | 725/75 |
| 2024/0080527 | A1* | 3/2024 | Harb ................... H04N 21/4668 |
| 2024/0251130 | A1 | 7/2024 | Berezhnoy et al. |

OTHER PUBLICATIONS

"U.S. Appl. No. 18/156,961, Notice of Allowability mailed Jul. 31, 2024".

"U.S. Appl. No. 18/156,961, Notice of Allowance mailed Jul. 16, 2024", 8 pgs.

"U.S. Appl. No. 18/156,961, Response filed Jun. 19, 2024 to Non Final Office Action mailed Mar. 26, 2024", 9 pgs.

"International Application Serial No. PCT/US2024/011994, International Search Report mailed Apr. 18, 2024", 4 pgs.

"International Application Serial No. PCT/US2024/011994, Written Opinion mailed Apr. 18, 2024", 7 pgs.

Begen, Ali C, et al., "Watching User Generated Videos with Prefetching", Proceedings of the 2011 ACM Multimedia Systems Conference : Feb. 23-25, 2011, San Jose, CA, USA, [Online]. Retrieved from the Internet: <URL: https://dl.acm.org/doi/pdf/10.1145/1943552.1943578>, (Feb. 23, 2011), 187-198.

U.S. Appl. No. 18/156,961, filed Jan. 19, 2023, Video Notification System.

"International Application Serial No. PCT/US2024/011994, International Preliminary Report on Patentability mailed Jul. 31, 2025", 9 pgs.

* cited by examiner

200

DATABASE(S)

120

300

| 302 | MSG_ID |
| 304 | MSG_TEXT |
| 306 | MSG_IMAGE |
| 308 | MSG_VID |
| 310 | MSG_AUD |
| 312 | MSG_ANNOT |
| 314 | MSG_DUR |
| 316 | MSG_LOCATION |
| 318 | MSG_STRY_ID |
| 320 | MSG_TAG |
| 322 | MSG_SENDER ID |
| 324 | MSG_RECEIVER ID |

208 IMAGE TABLE

210 VIDEO TABLE

212 ANNOTATION TABLE

206 STORY TABLE

202 ENTITY TABLE

500

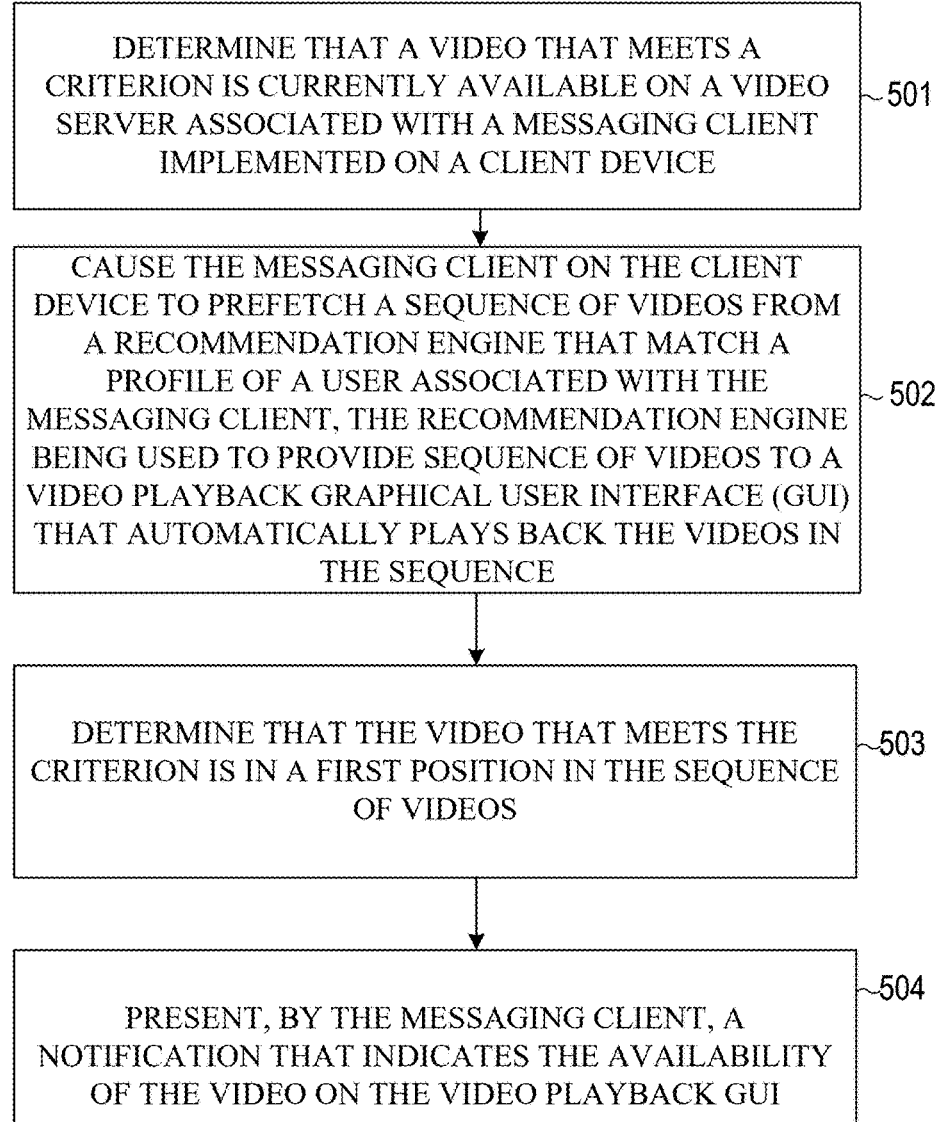

DETERMINE THAT A VIDEO THAT MEETS A CRITERION IS CURRENTLY AVAILABLE ON A VIDEO SERVER ASSOCIATED WITH A MESSAGING CLIENT IMPLEMENTED ON A CLIENT DEVICE ~501

CAUSE THE MESSAGING CLIENT ON THE CLIENT DEVICE TO PREFETCH A SEQUENCE OF VIDEOS FROM A RECOMMENDATION ENGINE THAT MATCH A PROFILE OF A USER ASSOCIATED WITH THE MESSAGING CLIENT, THE RECOMMENDATION ENGINE BEING USED TO PROVIDE SEQUENCE OF VIDEOS TO A VIDEO PLAYBACK GRAPHICAL USER INTERFACE (GUI) THAT AUTOMATICALLY PLAYS BACK THE VIDEOS IN THE SEQUENCE ~502

DETERMINE THAT THE VIDEO THAT MEETS THE CRITERION IS IN A FIRST POSITION IN THE SEQUENCE OF VIDEOS ~503

PRESENT, BY THE MESSAGING CLIENT, A NOTIFICATION THAT INDICATES THE AVAILABILITY OF THE VIDEO ON THE VIDEO PLAYBACK GUI ~504

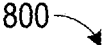
800
820
810
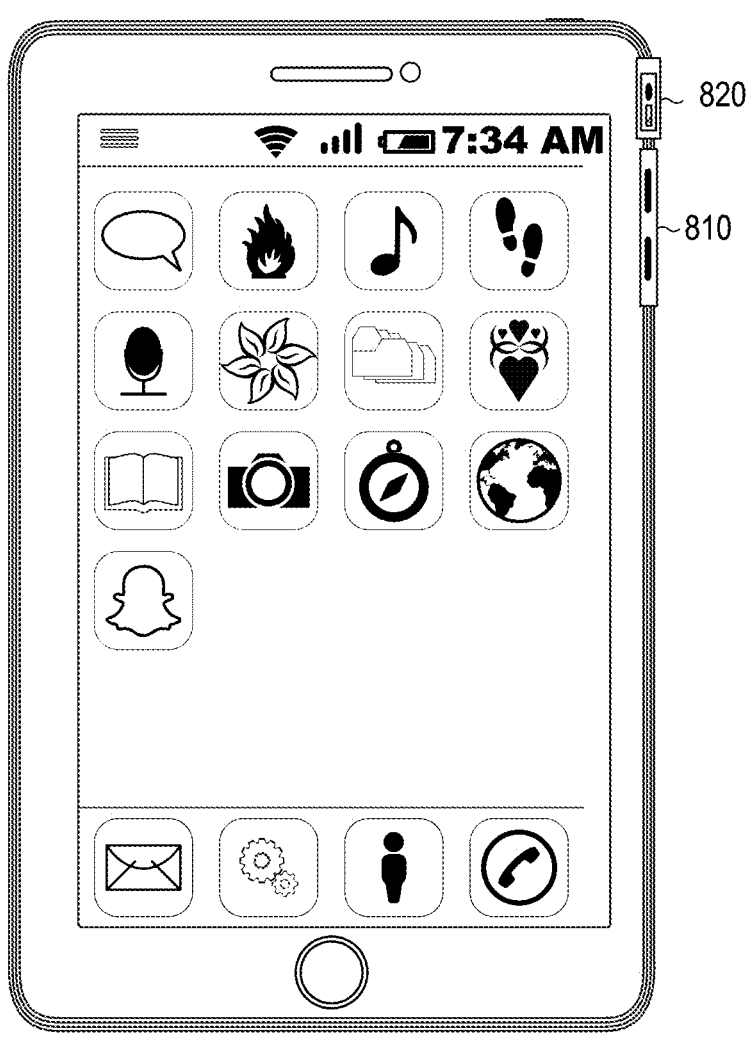
*FIG. 8*

VIDEO NOTIFICATION SYSTEM

CLAIM OF PRIORITY

This application is a continuation of U.S. patent application Ser. No. 18/156,961, filed on Jan. 19, 2023, which is incorporated herein by reference in its entirety.

TECHNICAL FIELD

The present disclosure relates generally to notifying users about videos on mobile devices.

BACKGROUND

Modern day user devices are used by users to consume videos throughout the day. Such videos can be shared with other users. The recipient users typically enjoy having the same experience as the sending users. There are many ways to share videos among users.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some examples are illustrated by way of example, and not limitation, in the figures of the accompanying drawings in which:

FIG. 5 is a flowchart illustrating example operations of the video notification system, according to some examples.

FIG. 8 shows an illustrative mobile user device or client device that employs the video notification system, according to some examples.

DETAILED DESCRIPTION

Figure 1:
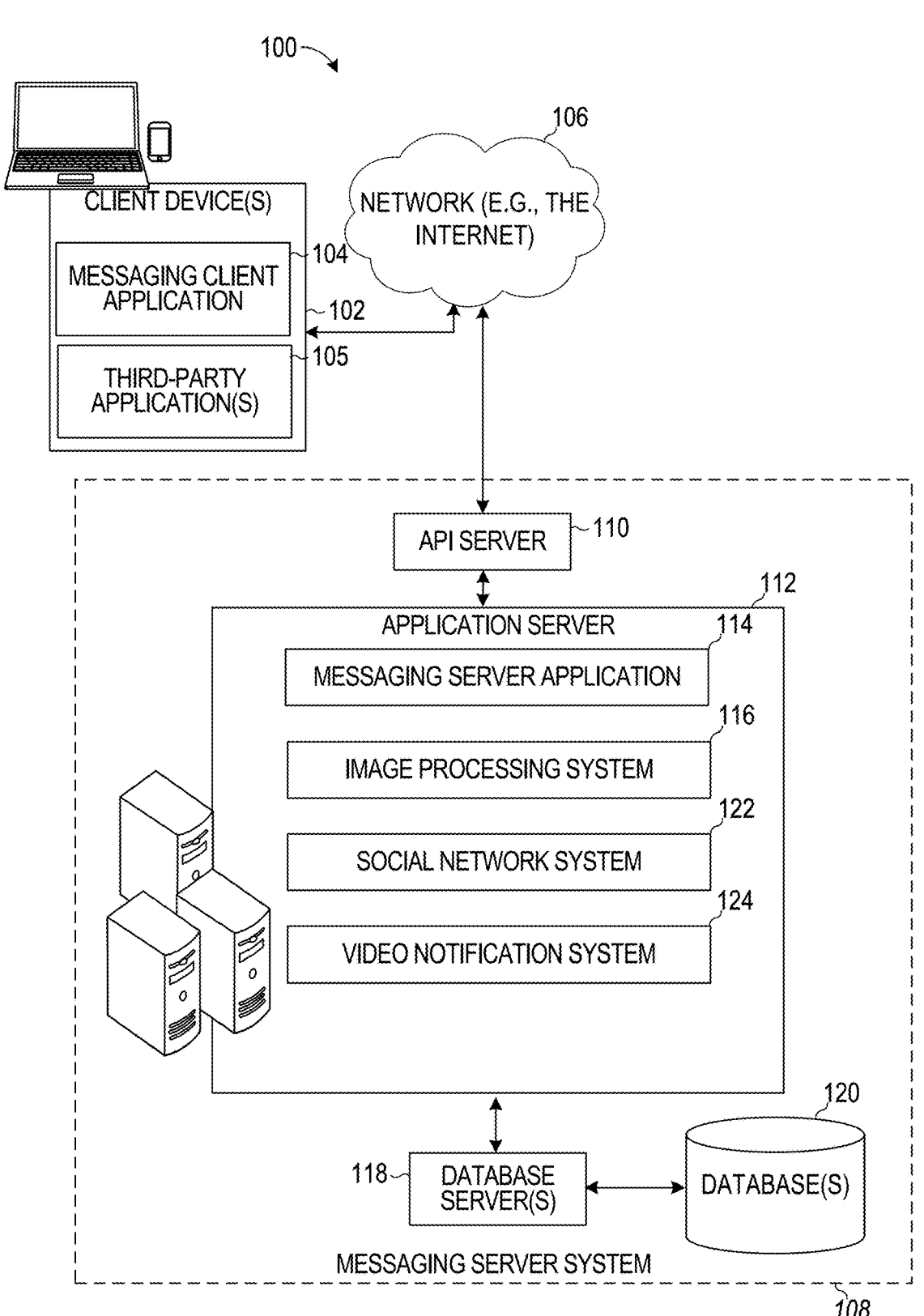
FIG. 1 is a block diagram showing an example messaging system for exchanging data (e.g., messages and associated content) over a network, according to some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Certain video consumption systems include a recommendation system that presents a random set of videos that match preferences of a given user when such systems are accessed by the user via a client device. These systems are configured to derive a content viewing profile for the user and analyze all of the available videos to identify the best or top videos for the user to view at a given time. These videos are then initially presented to the user when the systems are accessed in an automated or semi-automated basis and according to a defined sequence. Sometimes these systems receive new content or videos that match the content viewing preferences of a given user and need to notify the given user about the availability of new content or videos that match the content viewing preferences. This is typically done by presenting a badge or icon in association with the option used to launch the video consumption system. However, the timing for when the badge is presented and the set of videos that are presented when the systems are accessed by the user is typically unsynchronized.

Specifically, typical systems present the badge in response to detecting the addition of a new video that matches the profile, such as a video that is uploaded by a content creator to which the given user subscribes. However, the user may end up selecting the option to launch the video consumption systems at an unknown time in the future after the new video was added by the content creator. Specifically, the user may be alerted to new content by a particular content creator but then in the future, when the user selects to view the video, there are instead a selection of videos based on preferences that have been determined since that new video was provided. Because of this, the set of videos that are selected to be presented to the user by the recommendation system initially when the video consumption system is accessed may not include the new video provided by the content creator, which can lead to confusion. This may be because there may be other videos that better match the content viewing preferences of the user than the new video from the content creator. As a result, the user may be confused as to why the badge was presented as the user may interpret the badge as leading to the presentation of the new video from the content creator as the initial video that is presented when the video consumption system is accessed. This leads to unpredictable and erratic behavior.

In some cases, there may be a new video detection system that is used to detect the presence or existence of new videos being added. This new video detection system may instruct a client application or itself may present a badge to represent the existence of the new video being added. The client application or video detection system can present the badge and can receive a request to access the video consumption system at some later time. Then, the video consumption system selects a set of videos that match preferences of the user, which may or may not include that new video that was the cause of the badge being presented. The timing between when the video consumption system selects the videos and when the new video detection system presents the badge is unsynchronized. One way to address this issue is by having the client application constantly fetch and cache videos from the video consumption system to ensure that the videos that are cached or fetched correspond to those that include the new video that leads to a badge. However, performing these operations consumes a great deal of resources and can create unnecessary traffic on a server that hosts the video consumption system. This is incredibly inefficient and unpractical to implement and deploy on a large scale.

The disclosed examples improve the efficiency of using the electronic device by providing video playback and notification system that addresses these inefficiencies. Particularly, the disclosed examples verify, such as by a client application or messaging client, the availability of a video that meets some condition or criterion (e.g., a new video from a creator that the user subscribes to) as being included in a set of videos fetched from a video playback graphical user interface (GUI) before presenting the notification or badge for a user. In this way, when the user or input from a user is received that selects the notification or badge or icon associated with the notification or badge, the video that lead to the presentation of the badge is presented first in a sequence of videos by the video playback GUI. This ensures that the user is not confused by the content being presented in response to presentation of the badge or notification and increases a level of trust and confidence a user has operating the device.

Specifically, the disclosed techniques determine that a video that meets a criterion is currently available on a video server associated with a messaging client. In response to determining that the video that meets the criterion is currently available, the messaging client on the client device prefetches (e.g., downloads) a sequence of videos from a recommendation engine that match a profile of a user associated with the messaging client. The recommendation engine can be used to provide a sequence of videos to a video playback (GUI) that automatically plays back the videos in the sequence. The disclosed techniques determine that the video that meets the criterion is in a first position in the sequence of videos and, in response, present a notification that indicates the availability of the video on the video playback GUI.

In this way, the disclosed examples improve the efficiency of using the electronic device by reducing complexity a user experiences in accessing a video application. This reduces the device resources (e.g., processor cycles, memory, and power usage) needed to accomplish a task with the device.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 (also referred to as messaging client) and a third-party application 105. Each messaging client application 104 is communicatively coupled to other instances of the messaging client application 104, the third-party application 105, and a messaging server system 108 via a network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104, third-party applications 105, and between a messaging client application 104 and the messaging server system 108 includes functions (e.g., commands to invoke functions) and payload data (e.g., text, audio, video, or other multimedia data). Any disclosed communications between the messaging client application 104 and the third-party application(s) 105 can be transmitted directly from the messaging client application 104 to the third-party application(s) 105 and/or indirectly (e.g., via one or more servers) from the messaging client application 104 to the third-party application(s) 105.

The third-party application(s) 105 and the messaging client application 104 are applications that include a set of functions that allow the client device 102 to access a video notification system 124. The third-party application 105 is an application that is separate and distinct from the messaging client application 104. The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104. The third-party application 105 is an application that can be accessed by a client device 102 using separate login credentials than the messaging client application 104. Namely, the third-party application 105 can maintain a first user account and the messaging client application 104 can maintain a second user account. For example, the third-party application 105 can be a social networking application, a dating application, a ride or car sharing application, a shopping application, a trading application, a gaming application, or an imaging application.

In some examples, the messaging client application 104 may present a user with a video GUI that automatically and sequentially plays back a playlist or sequence of a plurality of videos. The videos can be provided by various users and/or content creators of the messaging client application 104. After a first video ends, the first video can automatically replay from the beginning or a second video can begin being played back. In some cases, the second video can begin being played back in response to an input, such as a swipe gesture, received from the user.

In some cases, the messaging client application 104 communicates with a video ranking module (also referred to as a content recommendation system) to retrieve a list of the plurality of videos that match preferences of a user of the messaging client application 104. Once the list of the plurality of videos are retrieved, cached or fetched, the messaging client application 104 begins playing back the videos in the video playback GUI. In some cases, the messaging client application 104 presents a dedicated on-screen option to launch the video playback GUI. In response to receiving input that selects the on-screen option, the messaging client application 104 communicates with the video ranking module by providing a user identifier of a user of the messaging client application 104 to fetch or retrieve the list of videos that best match the preferences of the user for presentation in the video playback GUI.

The video playback GUI (also referred to as the video GUI) may display one or more interactive representations (e.g., icons or thumbnails) that identify respective videos. The messaging client application 104 receives a user selection of a first one of the interactive representations. In response to receiving the user selection, the messaging client application 104 retrieves a first video that corresponds to the selected interactive representation and plays back or displays the video. In some cases, the first video may include a sequence of one or more video clips (e.g., 10-second video clips). The user can advance between each video clip in the video by tapping (physically touching for less than a threshold period of time [e.g., 1 second]) on the screen. In response to the user tapping on the screen, the messaging client application 104 retrieves a next video clip in the sequence. Once all of the video clips or once the first video is completely played back, a second video may be selected (e.g., by the user manually selecting a particular interactive representation or automatically by selecting a video that matches user interests). The second video may be played back and presented to the user.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112. The API server 110 exposes various functions supported by the application server 112, including account registration; login functionality; the sending of messages, via the application server 112, from a particular messaging client application 104 to another messaging client application 104 or third-party application 105; the sending of media files (e.g., images or video) from a messaging client application 104 to the messaging server application 114, and for possible access by another messaging client application 104 or third-party application 105; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the video notification system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the video notification system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The video notification system 124 performs some or all of the above functions of the messaging client application 104. For example, the video notification system 124 determines that a video that meets a criterion is currently available on a video server associated with the messaging client application 104 implemented on a client device 102. In response to determining that the video that meets the criterion is currently available on the video server, the video notification system 124 causes the messaging client application 104 on the client device 102 to prefetch (e.g., cache or fetch and locally store) a sequence of videos from a recommendation engine (e.g., the video ranking module) that match a profile of a user associated with the messaging client application 104. The recommendation engine can be used to provide a sequence of videos to the video playback GUI that automatically plays back the videos in the sequence. The video notification system 124 determines that the video that meets the criterion is in a first position in the sequence of videos. The video notification system 124, in response to determining that the video that meets the criterion is in the first position in the sequence of videos, presents, by the messaging client application 104, a notification that indicates the availability of the video on the video playback GUI.

In some examples, the notification includes a badge or icon that is displayed on top of or adjacent to an option associated with the video playback GUI presented by the GUI of the messaging client application 104. In some examples, the video notification system 124 receives input that selects the option for which the notification is displayed and, in response, presents the video playback GUI including the sequence of videos in full screen.

In some examples, the criterion corresponds to a new video received from a content creator to which the user subscribes or with whom the user is friends with on the messaging client application 104. In some examples, the criterion corresponds to trending content or popular content that is associated with popularity that transgresses a threshold value, the trending content or popular content being associated with a category of content that matches a profile of the user. In some examples, the video notification system 124 receives input that selects an option for accessing the video playback GUI after the notification is presented. In response to receiving the input, the video notification system 124 presents the video playback GUI including the sequence of videos in full screen and presents, together with a first video presented by the video playback GUI, a message that describes the criterion which caused the notification to be presented.

In some examples, the message is presented on top of or adjacent to the first video. In some examples, the video notification system 124 scans new content available on the video server periodically (e.g., every hour) to determine that the video that meets the criterion is currently available on the video server. In some examples, the video notification system 124 stores a flag in a database indicating that that the video that meets the criterion is currently available on the video server. In response to receiving a request to launch the messaging client application 104 on the client device 102, determines by the messaging client application 104 that the flag has been stored in the database. The messaging client application 104 prefetches the sequence of videos in response to determining that the flag has been stored in the database.

In some examples, the video notification system 124 trains a machine learning model to predict times of day when the user accesses the video playback GUI, such as based on training data. In some examples, the video notification system 124 applies the machine learning model to a current time to determine whether the current time corresponds to predicted times of day when the user accesses the video playback GUI. In response to determining that the current time corresponds to the predicted times of day and in response to determining that the video that meets the criterion is currently available on the video server, the video notification system 124 causes the messaging client application 104 on the client device 102 to prefetch the sequence of videos.

In some examples, the criterion includes a plurality of criteria. In some examples, the video notification system 124 instructs, by the messaging client application 104, the recommendation engine to fetch an additional sequence of videos as the sequence of videos are being presented in the video playback GUI.

In some examples, the video notification system 124 presents a first video in the sequence of videos in the video playback GUI. The video notification system 124, during playback of the first video and in an automated process, retrieves and presents a second video in the sequence of videos. In some examples, the second video is presented in response to receiving a swipe gesture. In some examples, the second video is presented automatically after the first video finishes playing back. In some examples, the first video loops playback and continues to be displayed from a beginning of the first video until input is received to present the second video.

The application server 112 is communicatively coupled to a database server 118, which facilitates access to a database 120 in which is stored data associated with messages processed by the messaging server application 114. Database 120 may be a third-party database. For example, the application server 112 may be associated with a first entity, and the database 120 or a portion of the database 120 may be associated and hosted by a second, different entity. In some implementations, database 120 stores user data that the first entity collects about each of the users of a service provided by the first entity. For example, the user data includes usernames, passwords, addresses, friends, activity information, preferences, videos or content consumed by the user, and so forth.

Figure 2:
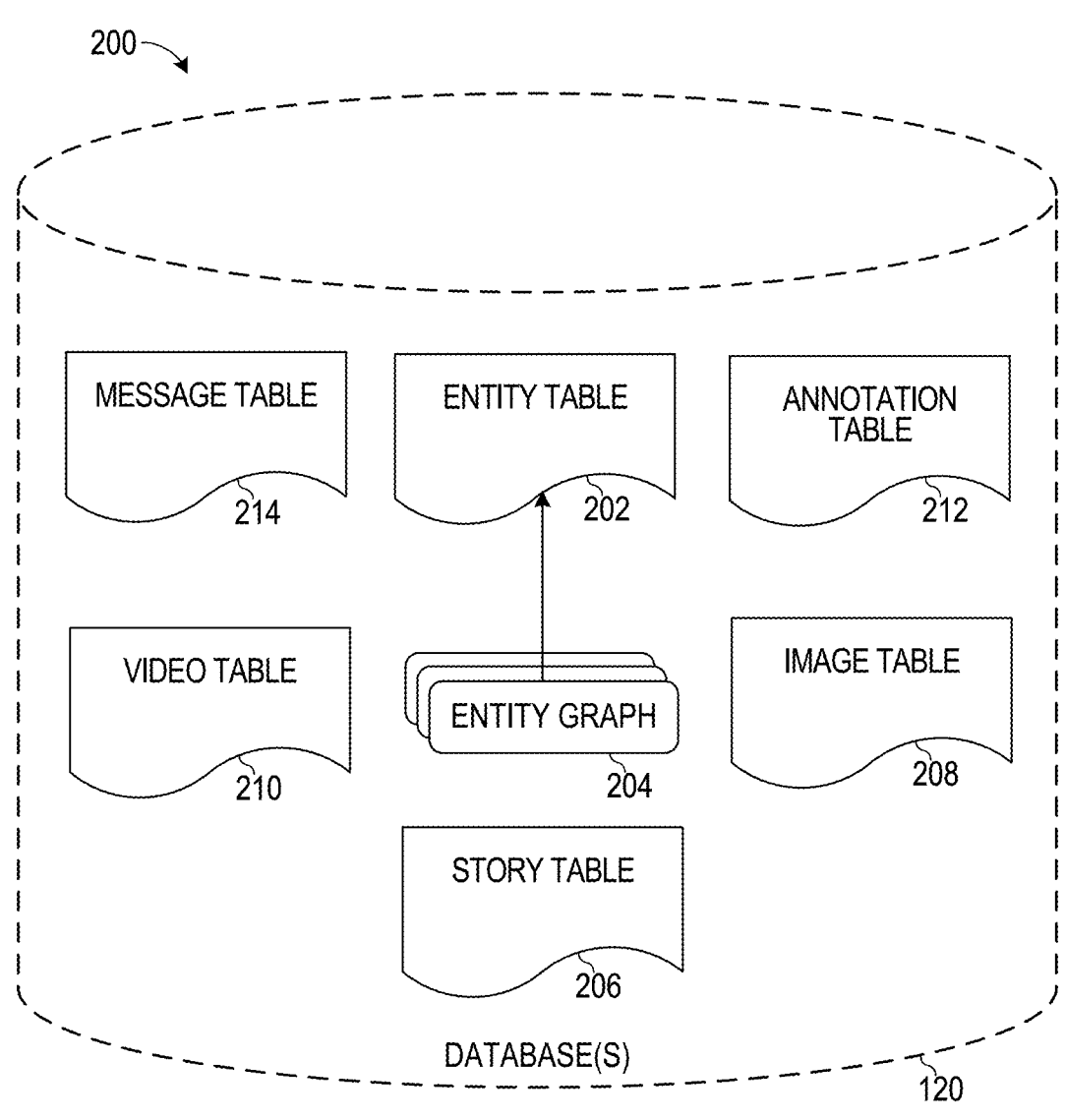
FIG. 2 is a schematic diagram illustrating data, which may be stored in the database of a messaging server system, according to some examples.

FIG. 2 is a schematic diagram 200 illustrating data, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data, which, in one example, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

Figure 3:
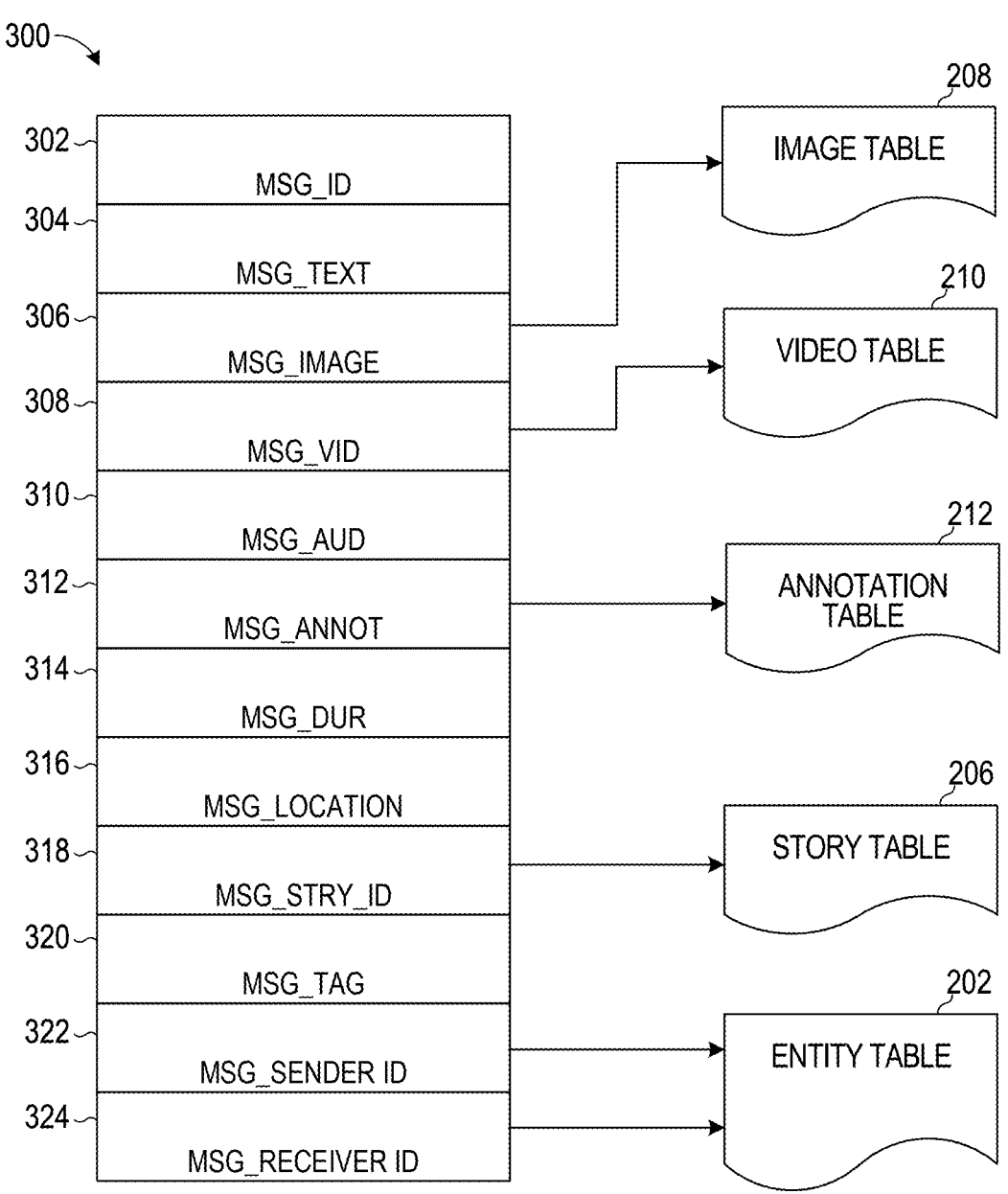
FIG. 3 is a schematic diagram illustrating a structure of a message generated by a messaging client application for communication, according to some examples.

FIG. 3 is a schematic diagram illustrating a structure of a message 300, according to some examples, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
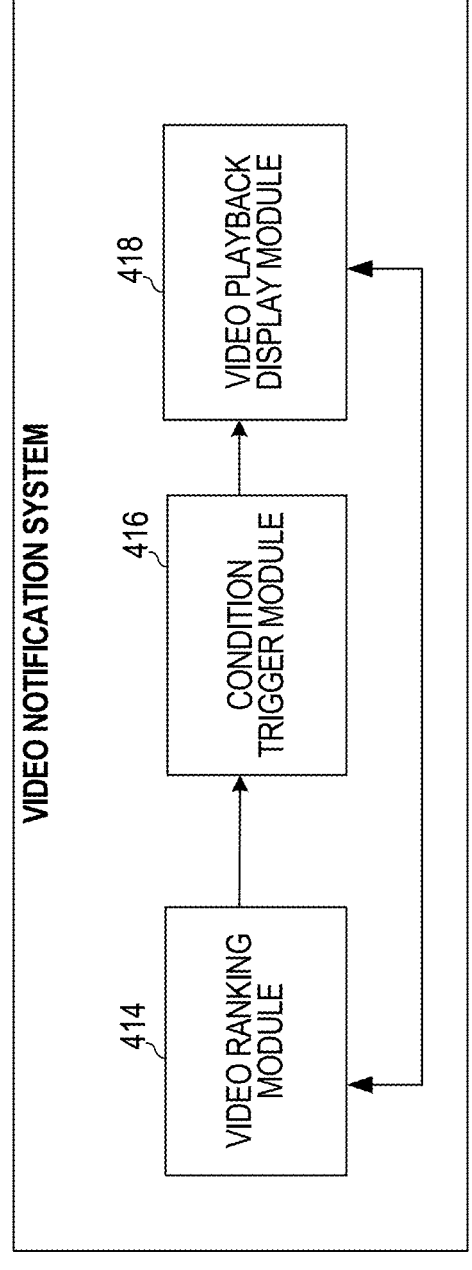
FIG. 4 is a block diagram showing an example video notification system, according to some examples.

FIG. 4 is a block diagram showing an example video notification system 124, according to examples. Video notification system 124 includes a video ranking module 414, a condition trigger module 416, and a video playback display module 418.

Video ranking module 414 generates a sequence of videos for presentation using the video playback GUI of a messaging client application 104 on respective client devices 102. For example, a first client device 102 can present a messaging client application 104 interface which includes a dedicated option to access the video playback GUI. In response to receiving input that selects the dedicated option, the messaging client application 104 communicates with the video ranking module 414 an identifier of the user of the client device 102 to fetch or prefetch a list of the best matching videos for the user. The messaging client application 104 receives from the video ranking module 414 the list of the best matching videos and launches in full screen the video playback GUI. The video ranking module 414 and/or the messaging client application 104 can then select a first video in the first plurality of videos and presents the first video in full screen on the client device 102.

After the first video ends and/or in response to receiving a swipe gesture or other input, the messaging client application 104 and/or the video ranking module 414 can transition the presentation of the video playback GUI from presenting the first video to presenting a second video in the first plurality of videos. Together with any video that is presented by the video playback GUI, the messaging client application 104 and/or the video ranking module 414 presents a plurality of options. For example, the plurality of options can include a modification option to modify the displayed video, a comment option to add a comment to the video being presented, and/or a share option. In response to receiving input that selects the share option (e.g., by selecting an on-screen menu option overlaid on top of or displayed adjacent to the video in the video playback GUI), the video ranking module 414 generates a message for transmission to a recipient that includes an identifier or link to the video then being displayed when the share option was selected.

The condition trigger module 416 can store one or more conditions or criteria for generating presentation of a badge or notification on the messaging client application 104. The badge or notification can visually inform a user of the messaging client application 104 that one or more videos of interest are newly available for access using the video playback GUI from the video ranking module 414. Specifically, the condition trigger module 416 can be used to cause the messaging client application 104 to display the badge or icon next to or in association with the option used to launch the video playback GUI by the messaging client application 104.

In some examples, the condition trigger module 416 can store a condition or criterion that identifies a user or content creator to which a given user subscribes. The condition trigger module 416 can continuously or periodically accesses a database of videos currently available on a video server associated with the video ranking module 414. The condition trigger module 416 can determine a timestamp representing a last time that the video playback GUI was accessed by the messaging client application 104 of the given user. The condition trigger module 416 can search the database of videos for any new video that has been uploaded since the timestamp (e.g., having a creation time that follows the timestamp). The condition trigger module 416 then determines whether any of the newly uploaded videos are associated with a content creator that matches the user or content creator to which the given user subscribes. In response to determining that one or more of the newly uploaded videos are associated with the content creator that matches the user or content creator to which the given user subscribes, the condition trigger module 416 stores a flag for the messaging client application 104 to access and determine the existence of such new videos. Based on the flag, the messaging client application 104 can later conditionally present a badge or notification in association with the option for accessing the video playback GUI.

In some examples, the condition trigger module 416 can store a condition or criterion that identifies a friend of the given user on the messaging client application 104. The friend can be a bi-directional friend of the given user. The condition trigger module 416 can continuously or periodically access a database of videos currently available on a video server associated with the video ranking module 414. The condition trigger module 416 can determine a timestamp representing a last time that the video playback GUI was accessed by the messaging client application 104 of the given user. The condition trigger module 416 can search the database of videos for any new video that has been uploaded since the timestamp (e.g., having a creation time that follows the timestamp). The condition trigger module 416 then determines whether any of the newly uploaded videos are associated with a content creator that matches or is the friend of the given user. In response to determining that one or more of the newly uploaded videos are associated with the content creator that matches the friend of the given user, the condition trigger module 416 stores a flag for the messaging client application 104 to access and determine the existence of such new videos. Based on the flag, the messaging client application 104 can later conditionally present a badge or notification in association with the option for accessing the video playback GUI.

In some examples, the condition trigger module 416 can store a condition or criterion that identifies a trending or popular video having a popularity that transgresses a threshold. The condition trigger module 416 can continuously or periodically accesses a database of videos currently available on a video server associated with the video ranking module 414. The condition trigger module 416 can determine a timestamp representing a last time that the video playback GUI was accessed by the messaging client application 104 of the given user. The condition trigger module 416 can search the database of videos for any new video that has been uploaded since the timestamp (e.g., having a creation time that follows the timestamp). The condition trigger module 416 then determines whether any of the newly uploaded videos trending or having a popularity that transgresses the threshold. In such cases, the condition trigger module 416 stores a flag for the messaging client application 104 to access and determine the existence of such new videos. Based on the flag, the messaging client application 104 can later conditionally present a badge or notification in association with the option for accessing the video playback GUI.

In some examples, after the flag is stored, the client device 102 can receive a user request to launch the messaging client application 104. When the messaging client application 104 is launched or opened, the messaging client application 104 queries the database to determine whether or not the flag has been stored. If the messaging client application 104 detects the existence of the flag, the messaging client application 104 communicates with the video ranking module 414 to obtain a list of videos that best match the current preferences of the given user. The messaging client application 104 can also provide the criterion or condition that led to the storage of the flag to the video ranking module 414. The video ranking module 414 generates the sequence of videos and determines whether the video in the first position in the sequence corresponds to and matches the criterion (e.g., was uploaded by a content creator to which the given user subscribes, is trending, was uploaded by a bi-directional friend of the given user, and so forth). If so, the video ranking module 414 informs the messaging client application 104, that the condition is met. In some cases, the video ranking module 414 simply provides the sequence of videos to the messaging client application 104 and the messaging client application 104 then performs the determination of whether the first video in the sequence matches the criterion. In either case, if the first video in the sequence matches the criterion, the messaging client application 104 presents the notification or badge in association with or adjacent to the option or icon used to launch the video playback GUI.

In response to receiving a user selection of the option or icon by the messaging client application 104, the messaging client application 104 communicates with the video playback display module 418 to begin playing back the sequence of videos fetched from the video ranking module 414 in full screen. In some examples, the messaging client application 104 presents in the video playback GUI a message that explains or represents the trigger or condition or criterion that caused the notification or badge to be presented. For example, as soon as the video in the first position in the sequence is presented in the video playback GUI, the messaging client application 104 overlays a message explaining why the video is in the first position. Specifically, the message can specify that the video in the first position was uploaded by a content creator to which the given user subscribes, is trending, was uploaded by a bi-directional friend of the given user, and so forth.

In some examples, the condition trigger module 416 can train a machine learning model (e.g., a neural network) to predict time or times when a user selects an option to launch a video playback GUI. The condition trigger module 416 can collect a set of training data by storing a time of day and/or time each time an icon or option is selected to launch the video playback GUI. The condition trigger module 416 then uses the training data in regression to train the machine learning model to predict whether a current time is likely to represent a time that the user accesses or will access the video playback GUI. Parameters of the machine learning model are updated iteratively by processing the actual times (ground truth times) with the features and/or activities performed by the user when the video playback GUI was launched. During runtime, the condition trigger module 416 collects a set of features and/or activities and a current time to predict the time or times that the video playback GUI will be accessed. If the predicted time or times fall within a range of a current time, the condition trigger module 416 can assert the flag to inform or cause the messaging client application 104 to present the notification or badge.

FIG. 5 is a flowchart illustrating example operations of the video notification system 124 in performing process 500, according to some examples. The process 500 may be embodied in computer-readable instructions for execution by one or more processors such that the operations of the process 500 may be performed in part or in whole by the functional components of the messaging server system 108 and/or third-party application 105; accordingly, the process 500 is described below by way of example with reference thereto. However, in other examples, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, the video notification system 124 determines that a video that meets a criterion is currently available on a video server associated with a messaging client implemented on a client device, as discussed above.

At operation 502, the video notification system 124 in response to determining that the video that meets the criterion is currently available on the video server, causes the messaging client application 104 on the client device to prefetch a sequence of videos from a recommendation engine that match a profile of a user associated with the messaging client, the recommendation engine being used to provide one or more sequences of videos to a video playback GUI that automatically plays back the videos in the sequence, as discussed above.

At operation 503, the video notification system 124 determines that the video that meets the criterion is in a first position in the sequence of videos, as discussed above. In response to determining that the video that meets the criterion is in the first position in the sequence of videos, the video notification system 124 presents, via the messaging client application 104, a notification that indicates the availability of the video on the video playback GUI, as shown in operation 504 and discussed above.

Figure 6:
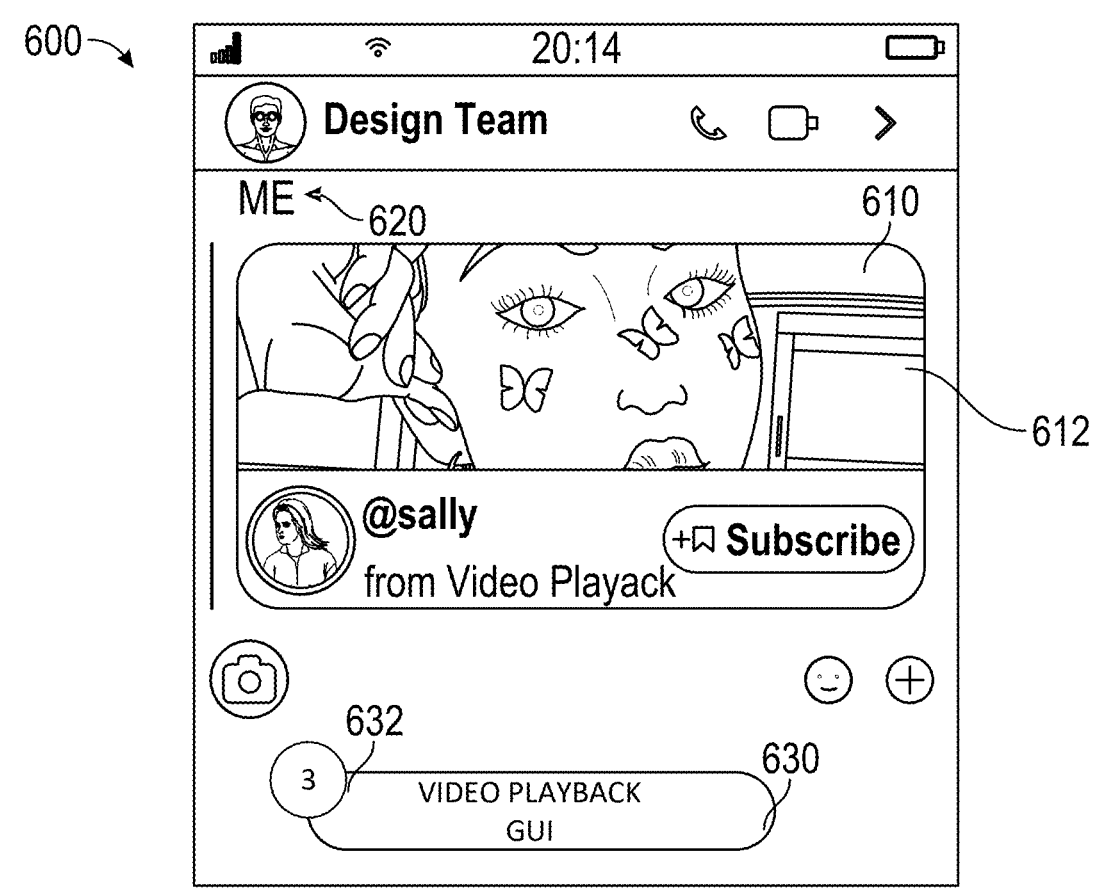
FIGS. 6-7 are illustrative inputs and outputs of the video notification system, according to some examples.
Figure 7:
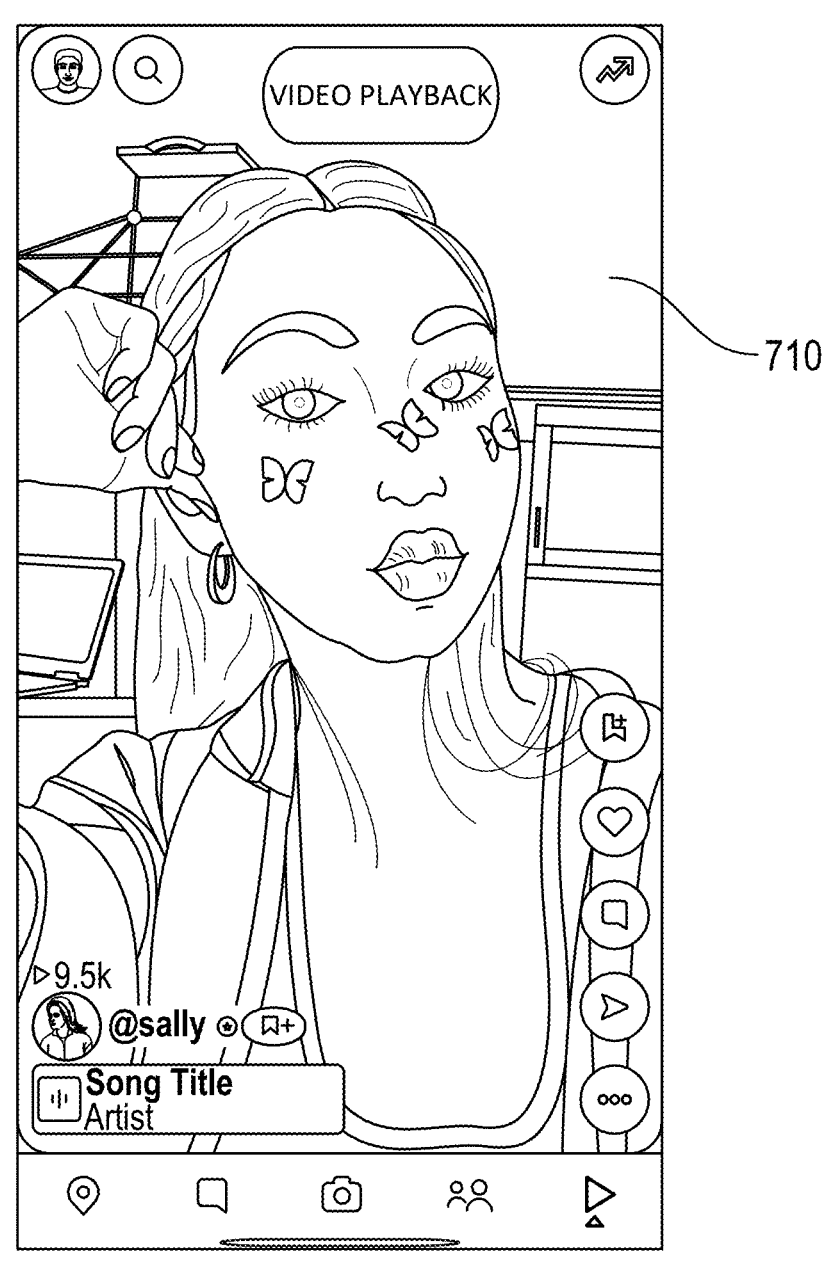

FIGS. 6 and 7 are illustrative inputs and outputs of the video notification system 124, according to examples. As shown in FIG. 6, a user interface 600 is initially accessed and displayed. The user interface 600 corresponds to a communication interface of the messaging client application 104. The communication interface represents one or more messages exchanged between a plurality of users. The messages can include a message 612 that represents a video 610 corresponding to a video playback GUI. The user interface 600 also indicates a sender of the message 612 using the message identifier 620.

The video notification system 124 can determine that a given video has recently been made available (e.g., uploaded by a content creator) and stored on a video server associated with a video playback GUI. In such cases, the video notification system 124 fetches a set of videos from a recommendation engine, such as the video ranking module 414. The video notification system 124 determines that a video in a first position in the set of videos matches the criterion. In such cases, the video notification system 124 presents a notification or badge 632 adjacent to or in association with an icon or option 630 used to launch the video playback GUI.

In some examples, the user interface 600 receives input that taps or selects the icon or option 630. In response, the user interface 600 transitions the display to launch the video playback GUI 700 shown in FIG. 7. Initially, the video playback GUI 700 presents the video 710 that is first in a position of the set of videos fetched from the video ranking module 414 in full screen. The video can be presented in FIG. 7 with a message indicating why the video is being displayed first in the sequence. The message can represent the criterion used to trigger the display of the notification or badge. After the video finishes being played back and/or in response to receiving a swipe UP/DOWN input, the video playback GUI 700 begins sequentially presenting videos that are included in the set of videos that are selected based on attributes, preferences, and/or a taste profile of a user of the client device 102.

FIG. 8 shows an illustrative mobile device 800 that employs the video notification system 124, according to examples. Mobile device 800 includes a physical mute switch 820 (e.g., ringer mute switch) and physical volume controls 810 (that include a volume UP button or key and a volume DOWN button or key). Physical mute switch 820 can be physically moved between two positions, a mute position (activated position) and an unmute position (de-activated position). The mute position disables audio output of the mobile device 800 but can be overridden by pressing a volume UP button while viewing some content. In such cases, audio of the content is presented to the user along with audio of subsequent content. Volume controls 810 include a volume DOWN button. Selecting or pressing the volume DOWN button a number of times gradually reduces a volume level of the mobile device 800 (e.g., by a certain predetermined amount each time the volume DOWN button is pressed). When the volume is reduced by pressing the volume DOWN button enough times to reach a mute state (in which the volume level is set to 0%).

Figure 9:
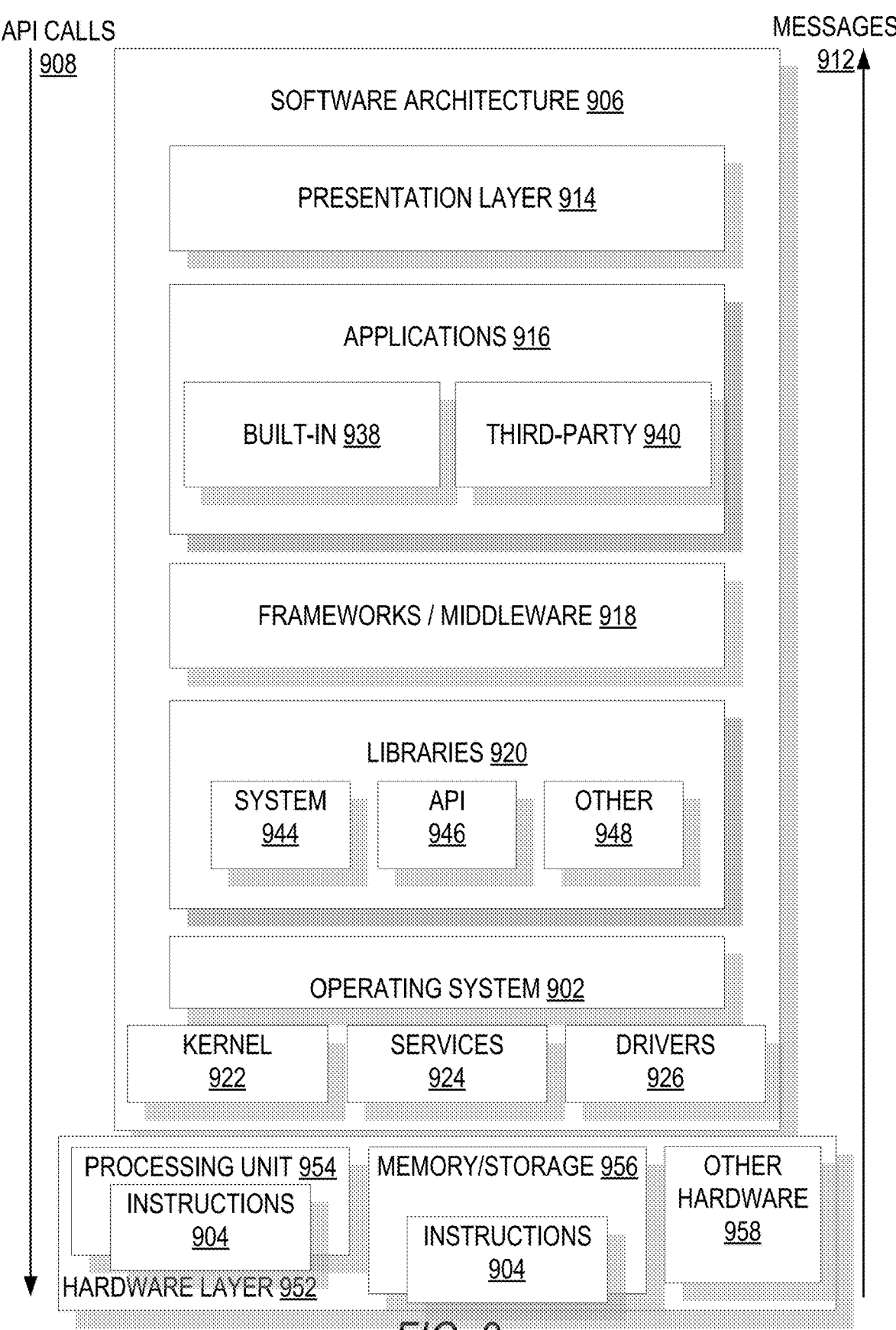
FIG. 9 is a block diagram illustrating a representative software architecture, which may be used in conjunction with various hardware architectures herein described, according to some examples.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914.

In these systems, the application/component "logic" can be separated from the aspects of the application/component that interact with a user.

Figure 10:
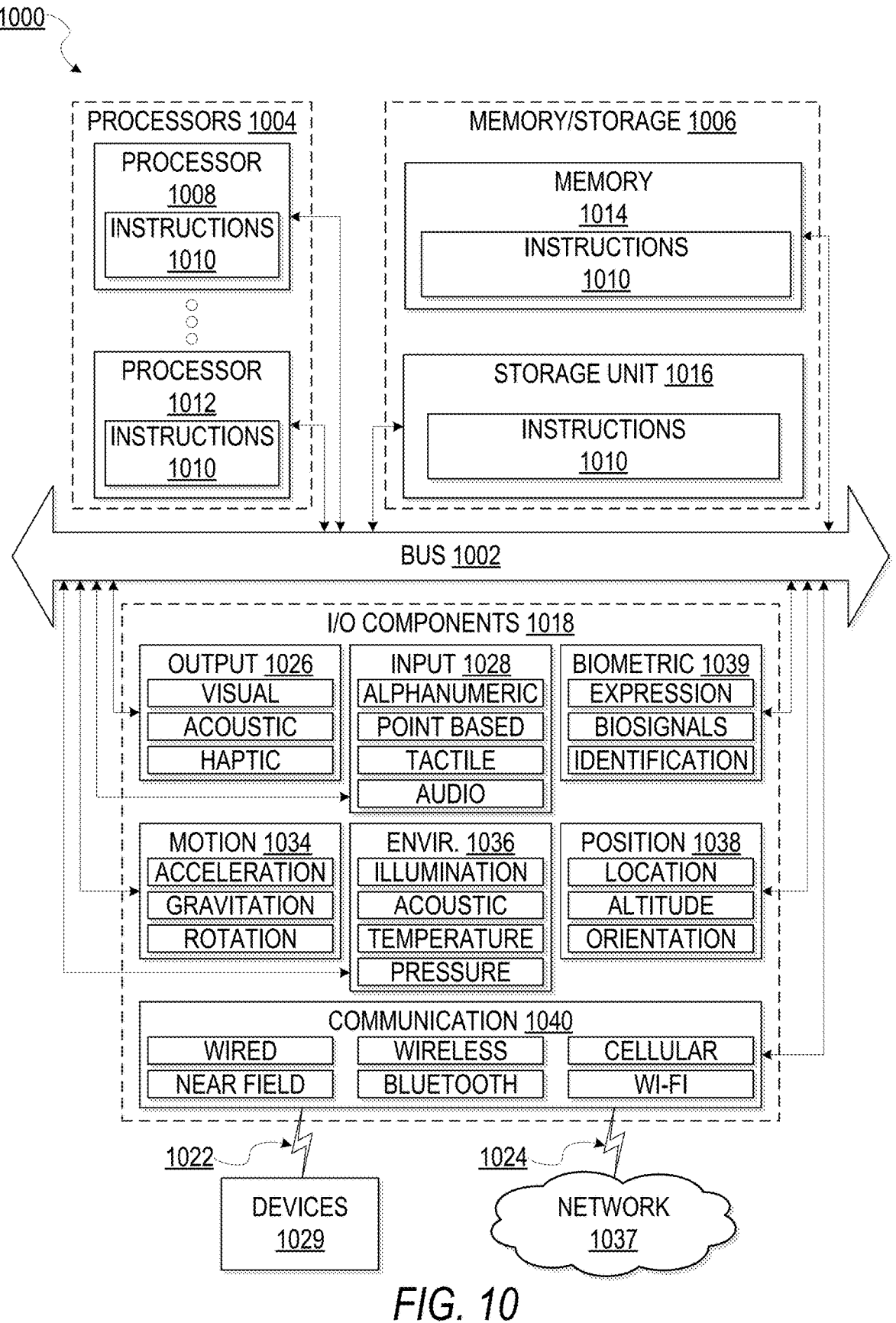
FIG. 10 is a block diagram illustrating components of a machine able to read instructions from a machine-readable medium (e.g., a machine-readable storage medium) and perform any one or more of the methodologies discussed herein, according to some examples.

FIG. 10 is a block diagram illustrating components of a machine 1000, according to some examples, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative examples, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various examples, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further examples, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via coupling 1024 and coupling 1022, respectively. For example, the communication components 1040 may include a network interface component or other suitable device to interface with the network 1037. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but also deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed examples without departing from the scope of the present disclosure. These and other changes or modifications are intended to be included within the scope of the present disclosure, as expressed in the following claims.

What is claimed is:
1. A method comprising:
storing a flag in a database indicating that a video that meets a criterion is currently available on a video server;

in response to receiving a request to launch an application on a user device, determining that the flag has been stored in the database;

establishing, by the user device implementing the application, a connection via the Internet with the video server;

prefetching, by the application, a sequence of videos by downloading the sequence of videos via the Internet connection from the video server to the user device for local storage in response to determining that the flag has been stored in the database; and in response to determining that the video meets the criterion, presenting a notification that indicates availability of the video, the notification comprising a badge displayed adjacent to a launch icon, the launch icon displayed on a messaging interface that presents a plurality of messages exchanged between users of the application;

the badge is presented in response to determining that:

the video that meets the criterion is in a first position in the sequence of videos prefetched from a recommendation engine, and the sequence of videos has been prefetched and stored locally on the user device;

in response to receiving user selection of the launch icon adjacent to which the badge icon is displayed:

ceasing display of the messaging interface, launching a video playback GUI in full screen on the user device, and automatically presenting the video that meets the criterion as a first video in the video playback GUI.

2. The method of claim 1, further comprising:

in response to determining that the video that meets the criterion is currently available on the video server, causing the application to prefetch the sequence of videos from the recommendation engine that match a profile of a user associated with the application, the recommendation engine being used to provide one or more sequences of videos to a video playback graphical user interface (GUI) that automatically plays back the videos in the sequence; and determining that the video that meets the criterion is in the first position in the sequence of videos.

3. The method of claim 2, further comprising:

receiving input that selects an option for which the notification is displayed; and in response to receiving the input, presenting the video playback GUI including the sequence of videos in full screen.

4. The method of claim 1, wherein the criterion corresponds to a new video received from a content creator to which a user subscribes or with whom the user is friends with on the application.

5. The method of claim 1, wherein the criterion corresponds to trending content or popular content that is associated with popularity that transgresses a threshold value, the trending content or popular content being associated with a category of content that matches a profile of a user.

6. The method of claim 1, further comprising:

presenting, together with the first video presented by the video playback GUI a message that describes the criterion which caused the notification to be presented.

7. The method of claim 6, wherein the message is presented on top of or adjacent to the first video.

8. The method of claim 1, further comprising:

scanning new content available on the video server periodically to determine that the video that meets the criterion is currently available on the video server.

9. The method of claim 1, further comprising:

training a machine learning model to predict times of day when a user accesses the video playback GUI.

10. The method of claim 9, further comprising:

applying the machine learning model to a current time to determine whether the current time corresponds to predicted times of day when the user accesses the video playback GUI; and in response to determining that the current time corresponds to the predicted times of day and in response to determining that the video that meets the criterion is currently available on the video server, causing the application to prefetch the sequence of videos.

11. The method of claim 1, further comprising:

instructing the recommendation engine to fetch an additional sequence of videos as the sequence of videos are being presented in the video playback GUI.

12. The method of claim 1, further comprising:

presenting the first video in the sequence of videos in the video playback GUI; and during playback of the first video and in an automated process, retrieving and presenting a second video in the sequence of videos.

13. The method of claim 12, wherein the second video is presented in response to receiving a swipe gesture.

14. The method of claim 13, wherein the second video is presented automatically after the first video finishes playing back.

15. The method of claim 13, wherein playback of the first video loops and continues to be displayed from a beginning of the first video until input is received to present the second video.

16. A system comprising:

at least one processor configured to perform operations comprising:

storing a flag in a database indicating that a video that meets a criterion is currently available on a video server;

in response to receiving a request to launch an application on a user device, determining that the flag has been stored in the database;

establishing, by the user device implementing the application, a connection via the Internet with the video server;

prefetching, by the application, a sequence of videos by downloading the sequence of videos via the Internet connection from the video server to the user device for local storage in response to determining that the flag has been stored in the database; and in response to determining that the video meets the criterion, presenting a notification that indicates availability of the video, the notification comprising a badge displayed adjacent to a launch icon, the launch icon displayed on a messaging interface that presents a plurality of messages exchanged between users of the application;

the badge is presented in response to determining that:

the video that meets the criterion is in a first position in the sequence of videos prefetched from a recommendation engine, and the sequence of videos has been prefetched and stored locally on the user device;

in response to receiving user selection of the launch icon adjacent to which the badge icon is displayed:
    ceasing display of the messaging interface,
    launching a video playback GUI in full screen on the user device, and
    automatically presenting the video that meets the criterion as a first video in the video playback GUI.

17. The system of claim 16, the operations comprising:

in response to determining that the video that meets the criterion is currently available on the video server, causing the application to prefetch the sequence of videos from the recommendation engine that match a profile of a user associated with the application, the recommendation engine being used to provide one or more sequences of videos to a video playback graphical user interface (GUI) that automatically plays back the videos in the sequence; and determining that the video that meets the criterion is in the first position in the sequence of videos.

18. A non-transitory machine-readable storage medium that includes instructions that, when executed by one or more processors of a client device, cause the client device to perform operations comprising:

storing a flag in a database indicating that a video that meets a criterion is currently available on a video server;

in response to receiving a request to launch an application on a user device, determining that the flag has been stored in the database;

establishing, by the user device implementing the application, a connection via the Internet with the video server;

prefetching, by the application, a sequence of videos by downloading the sequence of videos via the Internet connection from the video server to the user device for local storage in response to determining that the flag has been stored in the database; and in response to determining that the video meets the criterion, presenting a notification that indicates availability of the video, the notification comprising a badge displayed adjacent to a launch icon, the launch icon displayed on a messaging interface that presents a plurality of messages exchanged between users of the application;

the badge is presented in response to determining that:
    the video that meets the criterion is in a first position in the sequence of videos prefetched from a recommendation engine, and
    the sequence of videos has been prefetched and stored locally on the user device;

in response to receiving user selection of the launch icon adjacent to which the badge icon is displayed:
    ceasing display of the messaging interface,
    launching a video playback GUI in full screen on the user device, and
    automatically presenting the video that meets the criterion as a first video in the video playback GUI.

19. The non-transitory machine-readable storage medium of claim 18, wherein the criterion corresponds to a new video received from a content creator to which a user subscribes or with whom the user is friends with on the application.

20. The non-transitory machine-readable storage medium of claim 18, the operations comprising training a machine learning model to predict times of day when a user accesses the video playback GUI.

\* \* \* \* \*